US010578082B2

(12) United States Patent
Chen et al.

(10) Patent No.: US 10,578,082 B2
(45) Date of Patent: Mar. 3, 2020

(54) METHOD AND CONTROLLER FOR COORDINATING CONTROL OF WIND FARM DURING DISCONNECTION TO UTILITY GRID

(71) Applicant: ABB Schweiz AG, Baden (CH)

(72) Inventors: Yao Chen, Beijing (CN); Xing Huang, Beijing (CN)

(73) Assignee: ABB Schweiz AG, Baden (CH)

(*) Notice: Subject to any disclaimer, the term of this patent is extended or adjusted under 35 U.S.C. 154(b) by 164 days.

(21) Appl. No.: 15/631,768

(22) Filed: Jun. 23, 2017

(65) Prior Publication Data

US 2017/0284369 A1    Oct. 5, 2017

Related U.S. Application Data

(63) Continuation of application No. PCT/CN2014/094617, filed on Dec. 23, 2014.

(51) Int. Cl.
    *F03D 9/25*    (2016.01)
    *H02J 3/38*    (2006.01)
    (Continued)

(52) U.S. Cl.
    CPC ........... *F03D 9/257* (2017.02); *F03D 7/0264* (2013.01); *F03D 7/0272* (2013.01);
    (Continued)

(58) Field of Classification Search
    CPC ........... F03D 9/255; F03D 9/257; H02J 3/386
    See application file for complete search history.

(56) References Cited

U.S. PATENT DOCUMENTS 9,366,233 B2 *   6/2016   Bech ..................... H02J 3/18
9,509,141 B2 *   11/2016  Egedal ................ F03D 7/026
(Continued)

FOREIGN PATENT DOCUMENTS

CN    101309002 A    11/2008
CN    101465552 A    6/2009
(Continued)

OTHER PUBLICATIONS

State Intellectual Property Office of P.R. China, International Search Report and Written Opinion issued in corresponding Application No. PCT/CN2014/094617, dated Sep. 25, 2015, 9 pp.
(Continued)

*Primary Examiner* — Fritz M Fleming
(74) *Attorney, Agent, or Firm* — Taft Stettinius & Hollister LLP; J. Bruce Schelkopf (57) ABSTRACT

A method and a control system using the same for coordinating control of a plurality of wind turbines of a wind farm during a fault in a utility grid to which power is to be delivered via at least one cable of the wind farm. The method includes: opening each of the electrical connections; selecting at least one wind turbine of the plurality of wind turbines according to a criteria where a sum of value for active power supply that is available from the selected at least one generator is equal or above a sum of values for active power consumption that is consumable by the energy storage system of the selected at least one wind turbine, the auxiliary equipment of the selected at least one wind turbine and the substation level auxiliary equipment; activating the selected wind turbine; for the selected wind turbine: electrically connecting the power input of its converter to the power output of its generator, electrically connecting the power output of its converter to the power input of its auxiliary equipment, the power input of its energy storage system and
(Continued)

the corresponding cable, and electrically connecting the power input of a substation level auxiliary equipment to the cable which is electrically connected to the selected wind turbine; the activated wind turbine acting as active power supply for the substation level auxiliary equipment. The method and the control system using the same provide an effective and economic way of using the power generated by the wind turbine generator for powering the auxiliary equipment of the wind turbine, charging the energy storage system of the wind turbine and powering the substation level auxiliary equipment, during the wind farm operates in an islanding mode.

11 Claims, 3 Drawing Sheets

(51) Int. Cl.
*F03D 7/02* (2006.01)
*F03D 7/04* (2006.01)
*H02S 10/10* (2014.01)
*H02J 11/00* (2006.01)

(52) U.S. Cl.
CPC ........... *F03D 7/0284* (2013.01); *F03D 7/042* (2013.01); *H02J 3/386* (2013.01); *F05B 2270/107* (2013.01); *H02J 11/00* (2013.01); *H02J 2003/388* (2013.01); *H02S 10/10* (2014.12); *Y02E 10/725* (2013.01); *Y02E 10/763* (2013.01)

(56) References Cited

U.S. PATENT DOCUMENTS

| | | | |
|---|---|---|---|
| 10,072,633 B2* | 9/2018 | Brogan | ............... F03D 7/0276 |
| 10,156,225 B2* | 12/2018 | Huang | ................... H02J 3/386 |
| 2008/0284172 A1* | 11/2008 | Nielsen | ................... F03D 7/026 |
| | | | 290/44 |
| 2012/0146423 A1 | 6/2012 | Bodewes et al. | |
| 2015/0124496 A1* | 5/2015 | Yu | ........................... H02M 1/36 |
| | | | 363/35 |
| 2015/0256030 A1 | 9/2015 | Schult et al. | |

FOREIGN PATENT DOCUMENTS

| | | |
|---|---|---|
| CN | 102439299 A | 5/2012 |
| EP | 1993184 A1 | 11/2008 |
| EP | 2072813 A2 | 6/2009 |
| EP | 2072813 A3 | 12/2012 |
| WO | 2014082757 A1 | 6/2014 |
| WO | 2014165366 A1 | 10/2014 |

OTHER PUBLICATIONS

Supplementary European Search Report, European Patent Application No. 14908701.7, dated May 14, 2018, 3 pages.
Extended European Search Report, European Patent Application No. 14908701.7, dated Apr. 24, 2018, 3 pages.
Chinese Office Action, Chinese Patent Application No. 201480083940. X, dated Mar. 5, 2019, 9 pages including English translation.
Chinese Search Report, Chinese Patent Application No. 201480083940. X, dated Mar. 5, 2019, 3 pages including English translation.
Communication pursuant to Article 94(3) EPC dated Oct. 25, 2019 issued in EP Application No. 14908701.7 (5 pages).

* cited by examiner

METHOD AND CONTROLLER FOR COORDINATING CONTROL OF WIND FARM DURING DISCONNECTION TO UTILITY GRID

TECHNICAL FIELD

The invention relates to a method and controller for coordinating control of the wind turbines of a wind farm during its disconnection to a utility grid.

BACKGROUND ART

It is known that all offshore installations/units, an independent emergency source of electrical power is to be provided, which should be able to take over the supply of the emergency consumers, e.g. lighting and important communications and signalling systems, etc., when the main power supply fails; and the supply time period should meet the requirement from e.g. several hours to several days for different loads.

Offshore wind farm is one typical offshore application which is expected to grow in a steady pace and the installed power is expected to increase. The electrical system design should also comply with the requirements for emergency auxiliary load supply, including navigation lights, sensor and communication apparatus, ventilation and heating equipment etc., when the whole wind farm is disconnected from the onshore grid, e.g. in the circumstance of export cable failure.

Patent WO 2014082757 A1 discusses a method involving connecting a converter unit to an electrical network on network side. The electrical energy generated by a generator is fed into the electrical network via converter unit. The electrical energy is drawn from an energy storage unit by an auxiliary energy unit for an adjustable period of time if converter unit and auxiliary energy unit are disconnected from electrical network. The electrical energy generated by generator is then drawn by the auxiliary energy unit via the converter unit.

However, the reference suffers from the disadvantage: a separate machine is needed for charging the energy storage unit when its energy is consumed, and this will incur additional cost.

BRIEF SUMMARY OF THE INVENTION

It is therefore an objective of the invention to provide A method for coordinating control of a plurality of wind turbines of a wind farm during a fault in a utility grid to which power is to be delivered via at least one cable of the wind farm, wherein the wind turbine includes auxiliary equipment, an energy storage system, a generator, a converter whose power input is electrically connectable to power output of the generator and whose power output is electrically connectable to an power input of the auxiliary equipment, an power input of the energy storage system and the corresponding cable, a substation of the wind farm includes a substation level auxiliary equipment whose power input is electrically connectable to the at least one cable; the method includes: opening each of the electrical connections; selecting at least one wind turbine of the plurality of wind turbines according to a criteria where a sum of value for active power supply that is available from the selected at least one generator is equal or above a sum of values for active power consumption that is consumable by the energy storage system of the selected at least one wind turbine, the auxiliary equipment of the selected at least one wind turbine and the substation level auxiliary equipment; activating the selected wind turbine; for the selected wind turbine: electrically connecting the power input of its converter to the power output of its generator, electrically connecting the power output of its converter to the power input of its auxiliary equipment, the power input of its energy storage system and the corresponding cable; and electrically connecting power input of the substation level auxiliary equipment to the cable electrically connected to the selected wind turbine, the activated wind turbine acting as active power supply for the substation level auxiliary equipment.

According to another aspect of present invention, it provides a wind farm control system for performing the above method.

The method and the control system using the same provide an effective and economic way of using the power generated by the wind turbine generator for powering the auxiliary equipment of the wind turbine, charging the energy storage system of the wind turbine and powering the substation level auxiliary equipment, during the wind farm operates in an islanding mode. They are especially effective when the wind turbine energy storage system supplies energy to the wind turbine auxiliary equipment to ensure continuous standby operation, which results in its charge level decreases and the wind turbine energy storage system needs to be charged. Moreover, the substation level auxiliary equipment can be powered by the energy fed from the selected wind turbine generator. Finally, the substation level energy storage system can be charged by the energy from the selected wind turbine.

BRIEF DESCRIPTION OF THE DRAWINGS

The subject matter of the invention will be explained in more detail in the following text with reference to preferred exemplary embodiments which are illustrated in the drawings, in which.

The reference symbols used in the drawings, and their meanings, are listed in summary form in the list of reference symbols. In principle, identical parts are provided with the same reference symbols in the figures.

PREFERRED EMBODIMENTS OF THE INVENTION

Figure 1:
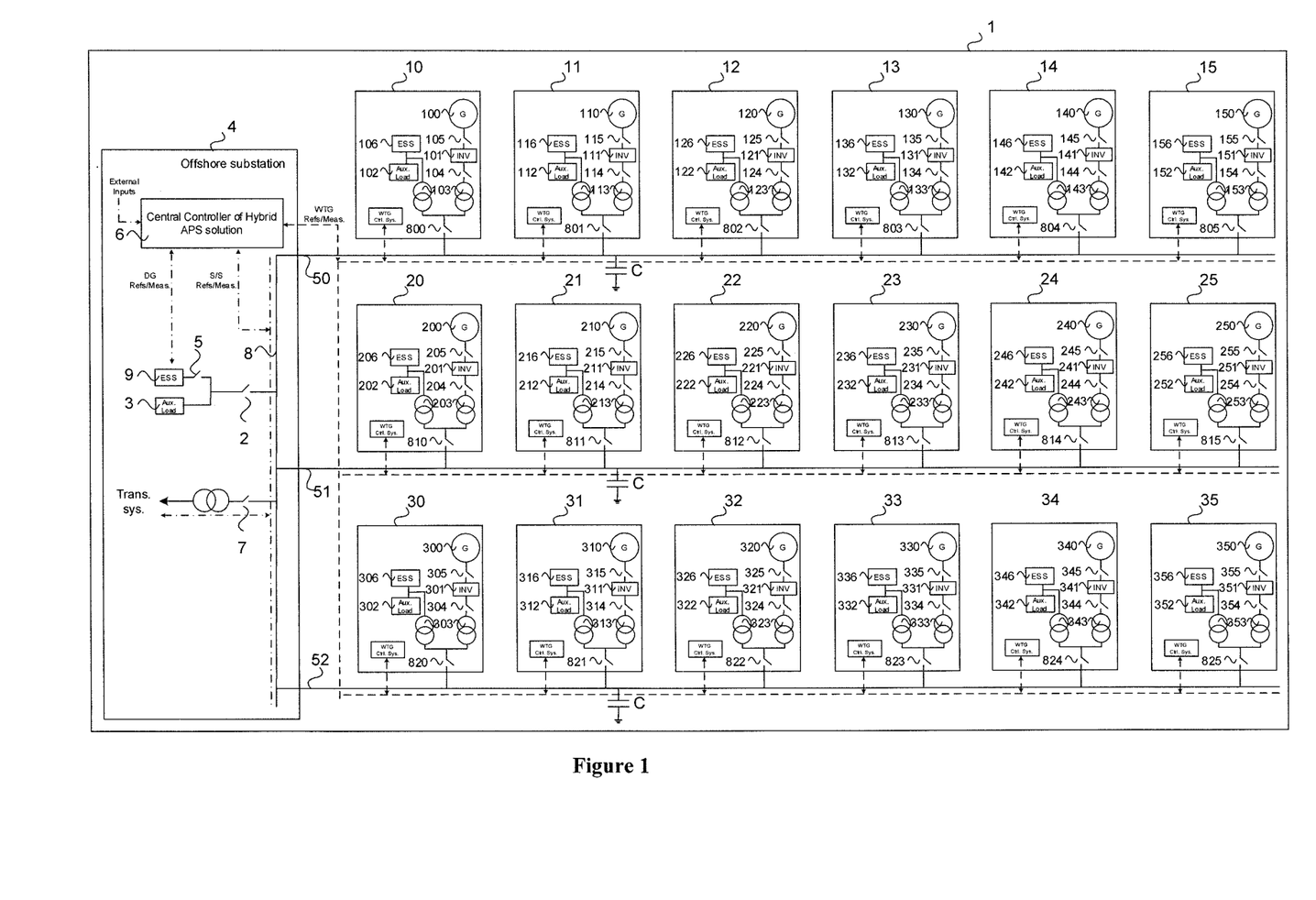
FIG. 1 schematically illustrates a wind farm according to an embodiment of present invention.

FIG. 1 schematically illustrates a wind farm according to an embodiment of present invention. As shown in FIG. 1, the wind farm 1 includes a plurality of wind turbines 10-15, 20-25, 30-35, a substation 4, at least one cable 50, 51, 52 and a control system 6. Each of the cables 50, 51, 52 is electrically connectable to a utility grid via a first switch 7, for example a circuit breaker. The first switch 7 can be opened when a fault in the utility grid occurred. The wind turbines are arranged in three groups, where group G1 consists of the wind turbines 10-15, group G2 consists of the wind turbines 20-25, and group G3 consists of the wind turbines 30-35.

Each of the wind turbines 10-15 of group G1 is electrically connectable to the cable 50 via respective one of second switches 800-805, each of the wind turbines 20-25 of group G2 is electrically connectable to the cable 51 via respective one of second switches 810-815, and each of the wind turbines 30-35 of group G3 is electrically connectable to the cable 52 via respective one of second switches 820-825. The skilled person shall understand that the number of cable can be equal or above one, and the wind turbines can be arranged in one or more group to deliver energy to the one or more cables. Where there is more than one cable 50, 51, 52, the wind farm 1 can include a bus bar 8 arranged between the first switch 7 and the respective cable 50, 51, 52 and electrically connecting the first switch 7 and the respective cable 50, 51, 52. Between the utility grid and the first switch 7, in the substation 4 one or more transformers may be arranged to transform a voltage supplied by the wind turbines to a higher voltage, and the first switch 7 can be arranged in the substation 4 as well.

Each of wind turbines 10-15, 20-25, 30-35 includes a generator 100-150, 200-250, 300-350, a converter 101-151, 201-251, 301-351, auxiliary equipment 102-152, 202-252, 302-352, a transformer unit 103-153, 203-253, 303-353 and an energy storage system 106-156, 206-256, 306-356. Power input of the converter 101-151, 201-251, 301-351 is electrically connectable to power output of the generator 100-150, 200-250, 300-350, power output of the converter 101-151, 201-251, 301-351 is electrically connectable to an power input of the auxiliary equipment 102-152, 202-252, 302-352, an power input of the energy storage system 106-156, 206-256, 306-356 and the corresponding cable 50, 51, 52. For example, the transformer unit 103-153, 203-253, 303-353 has a first winding circuit electrically connectable to the power input of the auxiliary equipment 102-152, 202-252, 302-352 and the power input of the energy storage system 106-156, 206-256, 306-356, a second winding circuit electrically connectable to the power output of the converter 101-151, 201-251, 301-351 via a third switch 104-154, 204-254, 304-354, a third winding circuit electrically connectable to the respective one of at least one cable 50, 51, 52 via the respective second switch 800-805, 810-815, 820-825, and the power input of the converter 101-151, 201-251, 301-351 is electrically connectable to the generator 100-150, 200-250, 300-350 via a fourth switch 105-155, 205-255, 305-355.—The respective generator 100-150, 200-250, 300-350 can supply energy to the respective converter 101-151, 201-251, 301-351. Each converter 101-151, 201-251, 301-351 converts a generally variable frequency energy stream delivered from the generator 100-150, 200-250, 300-350 to a fixed frequency energy stream supplied to the respective one of the cable 50, 51, 52, the respective one of the auxiliary equipment 102-152, 202-252, 302-352, and the respective one of the energy storage system 106-156, 206-256, 306-356. The fixed frequency energy stream supplied to the respective one of the cable 50, 51, 52 is supplied via the respective third switch 104-154, 204-254, 304-354, the respective transformer unit 103-153, 203-253, 303-353 and the respective second switch 800-805, 810-815, 820-825.

The wind farm 1 can also include substation level auxiliary equipment 9 located inside the substation 4, which can be electrically connectable to the cable 50, 51, 52 via a fifth switch 2 and the respective bus bar 8. By closing the fifth switch 2, energy can be delivered to and consumed by the substation level auxiliary equipment 9 from some of all of the generators 100-150, 200-250, 300-350 of the wind turbines 10-15, 20-25, 30-35.

Preferably, the substation 4 further includes a substation level energy storage system 3 electrically connectable to the at least one cable 50, 51, 52 via a sixth switch 5. The control system 6 can control to switch the on/off state of the second switch 800-805, 810-815, 820-825, the third switch 104-154, 204-254, 304-354, the fourth switch 105-155, 205-255, 305-355, the fifth switch 2, and the sixth switch 5. For example, the control system 6 can send command to the switches so that they act switch accordingly, either from on to off or vice versa. The second switch, the third switch, the fourth switch, the fifth switch and the sixth switch can be for example circuit breaker. During normal operation, energy can be delivered from the respective one of the wind turbines 10-15, 20-25, 30-35 to the utility grid via the respective closed second switch 800-805, 810-815, 820-825, the respective closed third switch 104-154, 204-254, 304-354, the respective closed fourth switch 105-155, 205-255, 305-355, and the respective one of the cables 50, 51, 52, and the closed first switch 7.

The cables 50, 51, 52 comprise distributed capacitance which may result in generation of reactive power. The effect of the distributed capacitance is denoted by capacitor C besides the respective cable. When any of the plurality of wind turbines 10-15, 20-25, 30-35 supplies power to the substation level auxiliary equipment 9 via the corresponding cable 50, 51, 52, a reactive power is generated thereon.

Figure 2:
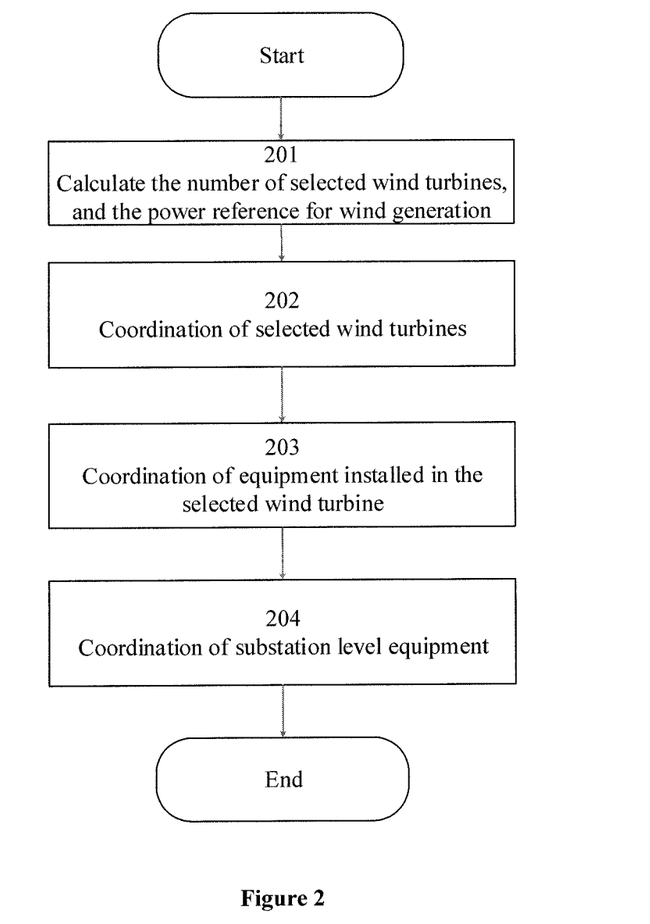
FIG. 2 is a flow chart illustrating the method for coordinating control of the wind turbines of the wind farm according to FIG. 1 during a fault in the utility grid.

FIG. 2 is a flow chart illustrating the method for coordinating control of the wind turbines of the wind farm according to FIG. 1 during a fault in the utility grid. As shown in FIG. 2, in step 200, the electrical connections are opened in the wind farm. For example, during a fault condition in the utility grid, the first switch 7 can be opened such that the wind turbines 10-15, 20-25, 30-35 are electrically disconnected to the utility grid. For example, the circuit breaker automatically opens to protect an electrical circuit from damage caused by overload or short circuit. Further, all of the second switches 800-805, 810-815, 820-825 connecting the wind turbines 10-15, 20-25, 30-35 to the cables 50, 51, 52 will be opened as well. So can be the third switch 104-154, 204-254, 304-354 and the fourth switch 105-155, 205-255, 305-355. When the switches are opened, the control system 6 may set the wind turbine in a standby mode by stopping the rotation of the turbine by pitching the wind blades in the vane position. A wind turbine in the standby mode (hereafter referred to as a "deactivated" wind turbine) is disconnected from the main grid. Hence in order to ensure continuous standby operation of the wind turbine, for example wind turbine 10, the power input of its auxiliary equipment 102 may be electrically connected to the power output of its energy storage system 106 (for example uninterruptable power supply (UPS)). Typically the UPS comprises a system of batteries and super capacitors set installed in or near the wind turbine. The skilled person shall understand that the energy storage system's power input and power output may share the same terminals. Following that, generally speaking, the wind turbine 10-15, 20-25, 30-35 can be activated to supply the auxiliary loads and the energy storage loads of the wind turbines 10-15, 20-25, 30-35, and the substation level auxiliary loads and substation level energy storage system in the wind farm 1 during islanding operation caused by utility grid failure. The selection of the power source to the auxiliary equipment and the energy storage systems of the wind turbines and the substation level auxiliary equipment can be controlled by the control system 6 commanding different on/off status of the second switch 800-805, 810-815, 820-825, the third switch 104-154, 204-254, 304-354, the fourth switch 105-155, 205-255, 305-355, the fifth switch 2, and the sixth switch 6.

In step 201, at least one wind turbine of the plurality of wind turbines 10-15, 20-25, 30-35 are selected according to the criteria:

$$n = \begin{cases} a, \text{ if } a < b \\ b, \text{ if } a \geq b \end{cases}$$

Where n is the number of selected wind turbines, a is the number of the available wind turbines which can operate in islanding mode with larger local wind turbine power generation capacity than the sum of local ESS charging power and local auxiliary load, b is the number of the required wind turbines where the sum of their wind turbine active power generation capacity is equal or above a sum of values for active power consumption that is consumable by the energy storage system of the selected at least one wind turbine, the auxiliary equipment of the selected at least one wind turbine and the substation level auxiliary equipment. For example, assume that in scenario 1, the number of the required wind turbines b is equal to 2, however the number of the available wind turbine a is equal to 1, for example wind turbine 10. In this case, the number of selected wind turbine n will be set to 1, and only wind turbine 10 will be selected. Assume that in another case scenario 2, the number of the required wind turbine b is equal to 2, however the number of the available wind turbine a is also equal to 3, for example wind turbine 10, wind turbine 11 and wind turbine 20. In this case, the number of selected wind turbine n will be set to 2, and two wind turbines for example wind turbine 10 and wind turbine 11 will be selected.

The active power supply available from the generator of the selected wind turbine can be regulated. The method according to present invention can further include a step of operating the generator of the selected wind turbine by referring to a power generation reference value; wherein: the power reference value is selected between a first power generation reference value and a second power generation reference value, whichever is smaller; the first power generation reference value represents the maximum active power supply by the generator of the selected wind turbine; and the second power generation reference value is a sum of values for: active power consumption that is consumable by the energy storage system of the selected wind turbine; active power consumption that is consumable by the auxiliary equipment of the selected wind turbine; and a predetermined fraction of active power consumption that is consumable by the substation level auxiliary equipment. For example, in scenario 1, where a=1, b=2, and according to the criteria introduced above, the final number of selected wind turbine n=1, where wind turbine 10 is selected. In this situation, the active power generation capacity of wind turbine 10 is less than the sum of values for active power consumption that is consumable by the energy storage system of wind turbine 10, the auxiliary equipment of wind turbine 10, and the substation level auxiliary equipment 9. Therefore the central controller 6 will order wind turbine 10 to generate the wind power generator by referring its first power generation reference value which equals to the maximum active power supply available from the generator of wind turbine 10.

In scenario 2, where a=3, b=2, and according to the criteria introduced above, the final number of selected wind turbine n=2, where wind turbine 10, and wind turbine 11 are selected. In this situation, the active power generation capacity of wind turbine 10 and wind turbine 11 is more than the sum of values for active power consumption that is consumable by the energy storage system of wind turbine 10 and wind turbine 11, the auxiliary equipment of wind turbine 10 and wind turbine 11, and the substation level auxiliary equipment 9. Therefore the central controller 6 will order wind turbine 10 and wind turbine 11 to share the active power consumption of substation level auxiliary equipment by referring their second power generation reference value which can be calculated as:

$$P_{ref\_i} = PA_{WTi} + PESS_{WTi} + kPA_{SS}$$

Where $PA_{SS}$ is the active power load of substation level auxiliary equipment, $PA_{WTi}$ is the active power of auxiliary load of the selected wind turbine i, $PESS_{WTi}$ is the charging power of ESS installed in the selected wind turbine i, k is the predetermined fraction, which can be set to either 1/n, or calculated by $P_{max\_WTi}/\Sigma P_{max\_WTi}$, meaning the maximum active power supply capability of selected wind turbine i over the sum of maximum active power supply capacities of all the selected wind turbines.

Preferably, to charge the substation level energy storage system 3, the active power consumption that is consumable by the substation level energy storage system is further calculated for the sum of value for active power consumption. Under this circumstance, the number of selected wind turbines should follow the criteria:

$$n = \begin{cases} a, \text{ if } a < b \\ b, \text{ if } a \geq b \end{cases}$$

Where a is the number of wind turbines which can operate in islanding mode with larger local wind turbine power generation capacity than the sum of local ESS charging power and local auxiliary load, b is the number of required wind turbines where the sum of their wind turbine active power generation capacity is equal or above a sum of values for active power consumption that is consumable by the substation level energy storage system, the energy storage system of the selected at least one wind turbine, the auxiliary equipment of the selected at least one wind turbine and the substation level auxiliary equipment.

When considering the influence by the substation level energy storage system, in contrast to the above, the active power supply available from the generator of the selected wind turbine can be regulated further in consideration of the influence of the substation level energy storage system. The method according to present invention can further include a step of operating the generator of the selected wind turbine by referring to a power generation reference value; wherein: the power reference value is selected between a first power generation reference value and a second power generation reference value, whichever is smaller; the first power generation reference value represents the maximum active power supply by the generator of the selected wind turbine; and the second power generation reference value is a sum of values for: active power consumption that is consumable by the energy storage system of the selected wind turbine; active power consumption that is consumable by the auxiliary equipment of the selected wind turbine; a predetermined fraction of active power consumption that is consumable by the substation level auxiliary equipment and the substation level energy storage system.

For example, in scenario 1, where a=1, b=2, and according to the criteria introduced above, the final number of selected wind turbine n=1, where wind turbine 10 is selected. In this situation, the active power generation capacity of wind turbine 10 is less than the sum of values for active power consumption that is consumable by the energy storage system of wind turbine 10, the auxiliary equipment of wind turbine 10, and the substation level auxiliary equipment 9, and substation level energy storage system 3. Therefore the central controller 6 will order wind turbine 10 to generate the wind power generator by referring its first power generation reference value which equals to the maximum active power supply available from the generator of wind turbine 10.

In scenario 2, where a=3, b=2, and according to the criteria introduced above, the final number of selected wind turbine n=2, where wind turbine 10, and wind turbine 11 are selected. In this situation, the active power generation capacity of wind turbine 10 and wind turbine 11 is more than the sum of values for active power consumption that is consumable by the energy storage system of wind turbine 10 and wind turbine 11, the auxiliary equipment of wind turbine 10 and wind turbine 11, the substation level auxiliary equipment 9, and the substation level energy storage system 3. Therefore the central controller 6 will order wind turbine 10 and wind turbine 11 to share the active power consumption of substation level auxiliary equipment and energy storage system by referring their second power generation reference value $P_{ref\_i}$ which can be calculated as:

$$P_{ref\_i}=PA_{WTi}+PESS_{WTi}+k(PA_{SS}+PESS_{SS})$$

Where $PESS_{SS}$ is the charging power of ESS installed in the substation, and the definition of other variables are the same as above thus won't be repeated here.

In step 202, the control system 6 controls to activate the selected wind turbine by restarting the stopped rotation of the turbine by pitching the wind blades out of the vane position. For example, under scenario 1, where a=1, b=2, the final number of selected wind turbine n=1, and wind turbine 10 is selected. In this situation, central controller will order wind turbine 10 to close its output circuit breaker 800 and start its wind power generator.

Under scenario 2, where a=3, b=2, the final number of selected wind turbine n=2, and wind turbine 10 and wind turbine 11 are selected. In this situation, controller will order wind turbine 10 to close its output circuit breaker 800 first, to build up the voltage of cable 50, than order wind turbine 11 to start its wind generator by synchronizing with the voltage and frequency of cable 50. After synchronization, wind turbine 11 will then close its output circuit breaker 801, by doing this to limit the inrush current through 801, and improve the system stability.

Figure 3:
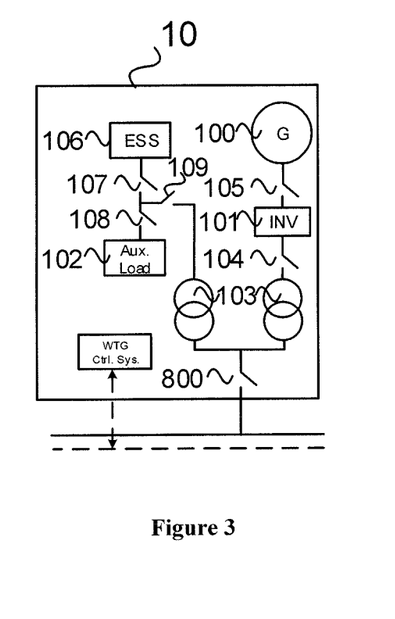
FIG. 3 shows the circuit topology of a wind turbine according to an embodiment of present invention.

In step 203, for the selected wind turbine: electrically connecting the power input of its converter to the power output of its generator, electrically connecting the power output of its converter to the power input of its auxiliary equipment, the power input of its energy storage system and the corresponding cable. For example, assume wind turbine 10 is selected, and its circuit topology is shown in FIG. 3. The distributed controller installed in wind turbine 10 will close the switches 107 and 108 to realize the electrical connection of energy storage system and auxiliary equipment, where use the energy storage system to provide power supply for the auxiliary equipment. Meanwhile the fourth switch 105 will be closed to connect the power output of the generator and the power input of the converter, after that the third switch 104 and switch 109 will be closed to use wind power to supply the local auxiliary load and local ESS. Finally the second switch 800 will be closed to connect wind turbine 10 to cable 50.

In step 204, in order to electrically connect the power input of the substation level auxiliary equipment to the cable electrically connected to the selected wind turbine, the fifth switch 2 will be closed, where the activated wind turbine acting as active power supply for the substation level auxiliary equipment. Preferably, to charge the substation level energy storage system 3, electrically connecting the substation level energy storage system to the cable electrically connected to the selected wind turbine, the sixth switch 5 will be closed.

The method according to FIG. 2 provides an effective and economic way of using the power generated by the wind turbine generator for powering the auxiliary equipment of the wind turbine, charging the energy storage system of the wind turbine and powering the substation level auxiliary equipment, during the wind farm operates in an islanding mode. The method is especially effective when the wind turbine energy storage system supplies energy to the wind turbine auxiliary equipment to ensure continuous standby operation, which results in its charge level decreases and the wind turbine energy storage system needs to be charged. Moreover, the substation level auxiliary equipment can be powered by the energy fed from the selected wind turbine generator. Finally, the substation level energy storage system can be charged by the energy from the selected wind turbine. As for the unselected wind turbine of the plurality of wind turbines, maintaining openness of the electrical connection between the third winding of transformer unit of unselected wind turbines and the corresponding cable. For example, assume wind turbine 10 is unselected, and then its second switch 800 will be kept open to be isolated from the cable 50.

As for the unselected wind turbine of the plurality of wind turbines, electrically connecting a power output of its energy storage system to the power input of its auxiliary equipment. For example, assume wind turbine 10 is unselected, shown in FIG. 3, wind turbine 10 will close the switches 107 and 108 to realize the electrical connection of local energy storage system and local level auxiliary equipment, using the energy storage system to provide power supply for the auxiliary equipment.

As for the unselected wind turbine of the plurality of wind turbines, if the wind speed is strong enough, and the wind turbine generator is capable of islanding operation, then wind turbine will electrically connect the power input of its converter to the power output of its generator, and electrically connecting the power output of its converter to the power input of its auxiliary equipment. For example, assume wind turbine 10 is unselected, as shown in FIG. 3, wind turbine 10 will further close the third switch 104, the fourth switch 105 and switch 109 to realize the electrical connection between wind generator 100, wind converter 101, auxiliary equipment 102 and energy storage system 106, using the wind generator to provide power supply for both energy storage system and the auxiliary equipment. Under this situation, the power reference of the wind turbine generator can also be chosen from the first power reference value and the second power reference value, whichever is smaller, as shown in the equation below:

$$P_{ref}=\min(P_{ref1},P_{ref2})$$

Where $P_{ref}$ is the power reference of the unselected wind turbine generator, $P_{ref1}$ is the maximum wind power capacity of unselected wind turbine, $P_{ref2}$ is the sum of values of action power consumption including the active power load of the auxiliary equipment and the maximum charging power capacity of the energy storage system of the unselected wind turbine.

Though the present invention has been described on the basis of some preferred embodiments, those skilled in the art should appreciate that those embodiments should by no way limit the scope of the present invention. Without departing from the spirit and concept of the present invention, any variations and modifications to the embodiments should be within the apprehension of those with ordinary knowledge and skills in the art, and therefore fall in the scope of the present invention which is defined by the accompanied claims.

The invention claimed is:

1. A method for coordinating control of a plurality of wind turbines of a wind farm during a fault in a utility grid to which power is to be delivered via at least one cable of the wind farm, wherein each of the plurality of wind turbines includes auxiliary equipment, an energy storage system, a generator, a converter whose power input is electrically connectable through a first switch to power output of the generator and whose power output is electrically connectable through a second plurality of switches to a power input of the auxiliary equipment, an power input of the energy storage system and the at least one cable, a substation of the wind farm includes a substation level auxiliary equipment whose power input is electrically connectable through a third switch to the at least one cable, the method includes:
opening each electrical connection associated with the first switch, second plurality of switches, and third switch;
selecting at least one wind turbine of the plurality of wind turbines according to a criteria where a sum of value for active power supply that is available from the selected at least one generator is equal or above a sum of values for active power consumption that is consumable by the energy storage system of the selected at least one wind turbine, the auxiliary equipment of the selected at least one wind turbine and the substation level auxiliary equipment;
activating the selected wind turbine;
for the selected at least one wind turbine: electrically connecting the power input of its converter to the power output of its generator, electrically connecting the power output of its converter to the power input of its auxiliary equipment, the power input of its energy storage system and the at least one cable; and
electrically connecting power input of the substation level auxiliary equipment to the at least one cable electrically connected to the selected wind turbine, the activated wind turbine acting as active power supply for the substation level auxiliary equipment.

2. The method according to claim 1, wherein the substation further includes a substation level energy storage system electrically connectable to the at least one cable, and active power consumption that is consumable by the substation level energy storage system is further calculated for the sum of value for active power consumption;
the method further includes electrically connecting the substation level energy storage system to the at least one cable electrically connected to the selected wind turbine.

3. The method according to claim 2, further including:
as for an unselected wind turbine of the plurality of wind turbines, maintaining openness of the electrical connection between power output of its converter and the at least one cable.

4. The method according to claim 3, further including:
as for an unselected wind turbine of the plurality of wind turbines, electrically connecting a power output of its energy storage system to the power input of its auxiliary equipment.

5. The method according to claim 2, further including:
operating the generator of the selected wind turbine by referring to a power generation reference value;
wherein:
the power reference value is selected between a first power generation reference value and a second power generation reference value, whichever is smaller;
the first power generation reference value represents the maximum active power supply by the generator of the selected wind turbine; and
the second power generation reference value is a sum of values for:
active power consumption that is consumable by the energy storage system of the selected wind turbine;
active power consumption that is consumable by the auxiliary equipment of the selected wind turbine;
a predetermined fraction of active power consumption that is consumable by the substation level auxiliary equipment and the substation level energy storage system.

6. The method according to claim 1, further including:
as for an unselected wind turbine of the plurality of wind turbines, maintaining an open connection of the electrical connection between power output of its converter and the at least one cable.

7. The method according to claim 6, further including:
as for an unselected wind turbine of the plurality of wind turbines, electrically connecting a power output of its energy storage system to the power input of its auxiliary equipment.

8. The method according to claim 6, further including:
as for an unselected wind turbine of the plurality of wind turbines, electrically connecting the power input of its converter to the power output of its generator, and electrically connecting the power output of its converter to the power input of its auxiliary equipment.

9. The method of claim 8, further including:
operating the generator of the unselected wind turbine by referring to a power generating reference value;
wherein:
the power reference value is selected between a first power generating reference value and a second power generating reference value, whichever is smaller;
the first power generating reference value represents the maximum active power supply by the generator of the unselected wind turbine; and
the second power generating reference value is a sum of values for:
active power consumption that is consumable by the energy storage system of the unselected wind turbine; and
active power consumption that is consumable by the auxiliary equipment of the unselected wind turbine.

10. The method according to claim 1, further including:
operating the generator of the selected wind turbine by referring to a power generation reference value;
wherein:
the power reference value is selected between a first power generation reference value and a second power generation reference value, whichever is smaller;

the first power generation reference value represents the maximum active power supply by the generator of the selected wind turbine; and the second power generation reference value is a sum of values for:
- active power consumption that is consumable by the energy storage system of the selected wind turbine;
- active power consumption that is consumable by the auxiliary equipment of the selected wind turbine; and
- a predetermined fraction of active power consumption that is consumable by the substation level auxiliary equipment.

11. A wind farm control system comprising:

a control system operable to control a plurality of wind turbines of a wind farm during a fault in a utility grid to which power is to be delivered via at least one cable of the wind farm, wherein each of the plurality of wind turbines includes auxiliary equipment, an energy storage system, a generator, a converter whose power input is electrically connectable to power output of the generator and whose power output is electrically connectable to an power input of the auxiliary equipment, an power input of the energy storage system and the at least one cable, a substation of the wind farm includes a substation level auxiliary equipment whose power input is electrically connectable to the at least one cable;

wherein the control system is operable for opening each electrical connection;

wherein at least one wind turbine of the plurality of wind turbines is selected according to criteria where a sum of value for an active power supply that is available from a corresponding generator is equal or above a sum of values for active power consumption that is consumable by the energy storage system of the selected at least one wind turbine, the auxiliary equipment of the selected at least one wind turbine and the substation level auxiliary equipment;

wherein the selected wind turbine is activated by the control system;

wherein the control system is operable to electrically connect the power input of the converter of the selected wind turbine to the power output of the generator of the selected turbine;

wherein the control system is operable to electrically connect the power output of the converter of the selected wind turbine to the power input of the auxiliary equipment of the selected wind turbine, to the power input of the energy storage system of the selected wind turbine and to the at least one cable;

wherein the control system is operable to electrically connect the power input of the substation level auxiliary equipment to the at least one cable; and wherein the activated wind turbine is an active power supply for substation level auxiliary equipment.

* * * * *